US010724613B2

(12) United States Patent
Komatsu et al.

(10) Patent No.: US 10,724,613 B2
(45) Date of Patent: Jul. 28, 2020

(54) TRANSMISSION DEVICE AND POWER GENERATION SYSTEM INCLUDING TRANSMISSION DEVICE

(71) Applicant: KAWASAKI JUKOGYO KABUSHIKI KAISHA, Kobe-shi, Hyogo (JP)

(72) Inventors: Kenji Komatsu, Kobe (JP); Kenichiro Tanaka, Kobe (JP); Shogo Fuchiwaki, Kakogawa (JP); Tatsuhiko Goi, Kobe (JP); Kippei Matsuda, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 263 days.

(21) Appl. No.: 15/557,635

(22) PCT Filed: Mar. 8, 2016

(86) PCT No.: PCT/JP2016/001260
§ 371 (c)(1),
(2) Date: Sep. 12, 2017

(87) PCT Pub. No.: WO2016/147606
PCT Pub. Date: Sep. 22, 2016

(65) Prior Publication Data
US 2018/0066735 A1 Mar. 8, 2018

(30) Foreign Application Priority Data

Mar. 13, 2015 (JP) ................................. 2015-050911

(51) Int. Cl.
F16H 15/38 (2006.01)
F16H 61/664 (2006.01)
(Continued)

(52) U.S. Cl.
CPC ............. F16H 15/38 (2013.01); B62M 11/12 (2013.01); F16H 15/52 (2013.01); F16H 61/00 (2013.01);
(Continued)

(58) Field of Classification Search
CPC ........ F16H 15/38; F16H 15/52; F16H 61/664; B62M 11/12; H02K 7/18
See application file for complete search history.

(56) References Cited

U.S. PATENT DOCUMENTS 6,132,333 A 10/2000 Inoue et al.
2005/0124454 A1* 6/2005 Nishizawa .......... F16H 61/6648
476/10
(Continued)

FOREIGN PATENT DOCUMENTS

DE 19757015 A1 6/1999
EP 2696057 A1 2/2014
(Continued)

OTHER PUBLICATIONS

Communication dated Oct. 15, 2018 from European Patent Office in counterpart application No. EP16764439.
(Continued)

Primary Examiner — David M Fenstermacher
(74) Attorney, Agent, or Firm — Sughrue Mion, PLLC

(57) ABSTRACT

In a transmission device, a power roller transmits a rotational driving force from an input disc to an output disc in a transmission ratio (transmission gear ratio) corresponding to a tilt motion angle. The power roller allows the transmission ratio to be changed in such a manner that the position of the trunnion on which the power roller is tiltably supported is changed by a trunnion drive mechanism. Hydraulic oil is supplied from a hydraulic pump to the trunnion drive mechanism via a direction selector valve. The direction
(Continued)

selector valve selects a flow direction of the hydraulic oil to supply the hydraulic oil to a speed reduction chamber or a speed increase chamber of the trunnion drive mechanism, and discharge the hydraulic oil from the other. In a case where a discharge condition is met, the controller controls a movement of the discharge valve to discharge the hydraulic oil from the speed increase chamber.

13 Claims, 9 Drawing Sheets

(51) Int. Cl.
    *H02K 7/10*     (2006.01)
    *F16H 61/00*     (2006.01)
    *B62M 11/12*     (2006.01)
    *F16H 15/52*     (2006.01)
    *H02K 7/18*     (2006.01)

(52) U.S. Cl.
    CPC ............ *F16H 61/664* (2013.01); *H02K 7/10* (2013.01); *H02K 7/18* (2013.01); *F16H 2302/04* (2013.01)

(56) References Cited

U.S. PATENT DOCUMENTS

| | | | | |
|---|---|---|---|---|
| 2009/0069146 A1* | 3/2009 | Soga | ........................ | F16H 61/12 476/3 |
| 2011/0105273 A1* | 5/2011 | Tabuchi | .............. | F16H 61/6649 476/10 |
| 2011/0143882 A1* | 6/2011 | Long | ........................ | F16D 48/02 476/10 |
| 2011/0144870 A1* | 6/2011 | Long | .................... | F16H 61/0276 701/51 |
| 2012/0202642 A1* | 8/2012 | Long | .................... | F16H 61/6648 476/3 |
| 2012/0202643 A1* | 8/2012 | Long | .................... | F16H 61/0206 476/10 |
| 2013/0035200 A1* | 2/2013 | Noji | ........................ | F16H 63/065 476/42 |
| 2014/0038770 A1* | 2/2014 | Goi | ............................ | F02C 7/32 476/8 |
| 2015/0018167 A1* | 1/2015 | Toyoda | ............... | B60W 10/109 476/11 |
| 2016/0102750 A1* | 4/2016 | Tanaka | .................... | F16H 15/38 476/8 |
| 2016/0131245 A1* | 5/2016 | Imai | .................... | F16H 57/0446 476/8 |

FOREIGN PATENT DOCUMENTS

JP     8-233083 A     9/1996
JP     2008-261501 A     10/2008

OTHER PUBLICATIONS

International Search Report of PCT/JP2016/001260 dated Jun. 14, 2016.

* cited by examiner

TRANSMISSION DEVICE AND POWER GENERATION SYSTEM INCLUDING TRANSMISSION DEVICE

CROSS REFERENCE TO RELATED APPLICATIONS

This application is a National of Application No. PCT/JP2016/001260 filed Mar. 8, 2016, claiming priority based on Japanese Patent Application No. 2015-050911 filed Mar. 13, 2015, the contents of all of which are incorporated herein by reference in their entirety.

TECHNICAL FIELD

The present invention relates to a transmission device including a toroidal continuously variable transmission (toroidal CVT), and a power generation system including the transmission device.

BACKGROUND ART

As a transmission device which increases or reduces the speed of a rotational driving force of an input shaft side and then transmits the rotational driving force to an output shaft side, for example, a transmission control device of a toroidal continuously variable transmission (toroidal CVT) disclosed in Patent Literature 1 is known. In the device disclosed in Patent Literature 1, a power roller retained between an input disc and an output disc is tilted so that a transmission ratio (transmission gear ratio) is continuously changed. The power roller is tiltably supported by a trunnion. The trunnion is displaced in a direction of a tilt motion axis so that the power roller is tilted. The trunnion includes a hydraulic (hydraulically actuated) cylinder mechanism. Hydraulic oil is supplied to the cylinder mechanism, and the cylinder mechanism advances or retracts a piston to cause the trunnion to be displaced in the direction of the tilt motion axis. The piston includes a hydraulic actuation device including a spool valve and a pump. The hydraulic actuation device supplies the hydraulic oil discharged from the pump to the cylinder mechanism, and causes the spool valve to select (switch) a flow direction of the hydraulic oil to be supplied to the cylinder mechanism. The cylinder mechanism advances or retracts the piston according to the flow direction of the hydraulic oil supplied to the cylinder mechanism. According to the advancement or retraction of the piston, the power roller is tilted, and the speed of the rotational driving force of the input shaft side is increased or reduced according to the tilt motion angle of the power roller.

CITATION LIST

Patent Literature

Patent Literature 1: Japanese Laid-Open Patent Application Publication No. Hei. 8-233083

SUMMARY OF INVENTION

Technical Problem

In the device disclosed in Patent Literature 1, the spool valve includes a casing and a spool, and the spool is slidable inside the casing. Two pilot pressures, facing each other, act on the both ends of the spool in opposite directions. The spool is movable to a position corresponding to a differential pressure between the two pilot pressures. The spool valve flows the hydraulic oil in a direction corresponding to the position of the spool. This hydraulic oil may sometimes contain foreign matters such as metal powder. The foreign matters may move into a region between the spool and the casing, so that the spool is stuck, for example, and becomes unmovable. In a state in which the spool remains unmovable, the position of the trunnion cannot be adjusted. As a result, the transmission ratio cannot be controlled to reach a desired ratio. In a case where a predetermined condition is met, such as the above-described situation, it is desirable to sufficiently reduce the speed of the rotational driving force of the input side by increasing the transmission ratio, and then output the rotational driving force with the reduced speed from the output side.

Accordingly, an object of the present invention is to provide a transmission device which can sufficiently reduce the speed of the rotational driving force of the input side by increasing the transmission ratio, and then output the rotational driving force with the reduced speed from the output side, in a case where the predetermined condition is met, and a power generation system including this transmission device.

Solution to Problem

According to an aspect of the present invention, a transmission device comprises: an input disc and an output disc which are disposed to face each other; a power roller which is tiltably disposed between the input disc and the output disc and transmits a rotational driving force of the input disc to the output disc in a transmission ratio corresponding to a tilt motion angle of the power roller; a trunnion on which the power roller is rotatably supported, a position of the trunnion being changed to change the tilt motion angle of the power roller; a trunnion drive mechanism which includes a speed reduction chamber and a speed increase chamber, changes the position of the trunnion to increase the transmission ratio in a case where the hydraulic oil is supplied to the speed reduction chamber and the hydraulic oil is discharged from the speed increase chamber, and changes the position of the trunnion to reduce the transmission ratio in a case where the hydraulic oil is supplied to the speed increase chamber and the hydraulic oil is discharged from the speed reduction chamber; a hydraulic pump which discharges the hydraulic oil to be supplied to the trunnion drive mechanism; a direction selector valve which selects a flow direction of the hydraulic oil discharged from the hydraulic pump to supply the hydraulic oil to one of the speed reduction chamber and the speed increase chamber and discharge the hydraulic oil from the other of the speed reduction chamber and the speed increase chamber; a discharge valve which discharges the hydraulic oil from the speed increase chamber; and a controller which controls a movement of the discharge valve to discharge the hydraulic oil from the speed increase chamber in a case where a predetermined discharge condition is met.

In accordance with this configuration, in a case where the predetermined discharge condition is met, the discharge valve discharges the hydraulic oil from the speed increase chamber. This allows the trunnion drive mechanism to change the position of the trunnion to increase the transmission ratio (transmission gear ratio). As a result, the speed of the rotational driving force of the input disc which is on the input side can be sufficiently reduced, and then the rotational driving force with the reduced speed can be output from the output disc.

According to another aspect of the present invention, a transmission device comprises: an input disc and an output disc which are disposed to face each other; a power roller which is tiltably disposed between the input disc and the output disc and transmits a rotational driving force of the input disc to the output disc in a transmission ratio corresponding to a tilt motion angle of the power roller; a trunnion on which the power roller is rotatably supported, a position of the trunnion being changed to change the tilt motion angle of the power roller; a trunnion drive mechanism which includes a speed reduction chamber and a speed increase chamber, changes the position of the trunnion to increase the transmission ratio in a case where the hydraulic oil is supplied to the speed reduction chamber and the hydraulic oil is discharged from the speed increase chamber, and changes the position of the trunnion to reduce the transmission ratio in a case where the hydraulic oil is supplied to the speed increase chamber and the hydraulic oil is discharged from the speed reduction chamber; a hydraulic pump which discharges the hydraulic oil to be supplied to the trunnion drive mechanism; a direction selector valve which selects a flow direction of the hydraulic oil to be supplied to the trunnion drive mechanism according to a position of a spool to supply the hydraulic oil to one of the speed reduction chamber and the speed increase chamber and discharge the hydraulic oil from the other of the speed reduction chamber and the speed increase chamber; a pressure application mechanism which applies a pressure to the spool to select a flow direction of the hydraulic oil to be supplied to the trunnion drive mechanism to cause the hydraulic oil to flow toward the speed reduction chamber, and a controller which activates the pressure application mechanism to select the flow direction of the hydraulic oil in a case where a predetermined discharge condition is met.

In accordance with this configuration, in a case where the predetermined discharge condition is met, the pressure application mechanism pushes the spool to change the position of the spool so that the hydraulic oil is supplied to the speed reduction chamber. This allows the trunnion drive mechanism to change the position of the trunnion to increase the transmission ratio (transmission gear ratio). As a result, the speed of the rotational driving force of the input disc which is on the input side can be sufficiently reduced, and then the rotational driving force with the reduced speed can be output from the output disc.

Advantageous Effects of Invention

In accordance with the present invention, in a case where the predetermined condition is met, the speed of the rotational driving force of the input side can be sufficiently reduced by increasing the transmission ratio, and then the rotational driving force with the reduced speed can be output from the output side.

The above and further objects, and advantages of the invention will more fully be apparent from the following detailed description with reference to the accompanying drawings.

DESCRIPTION OF EMBODIMENTS

Hereinafter, embodiments will be described with reference to the drawings.

Embodiment 1

Figure 1:
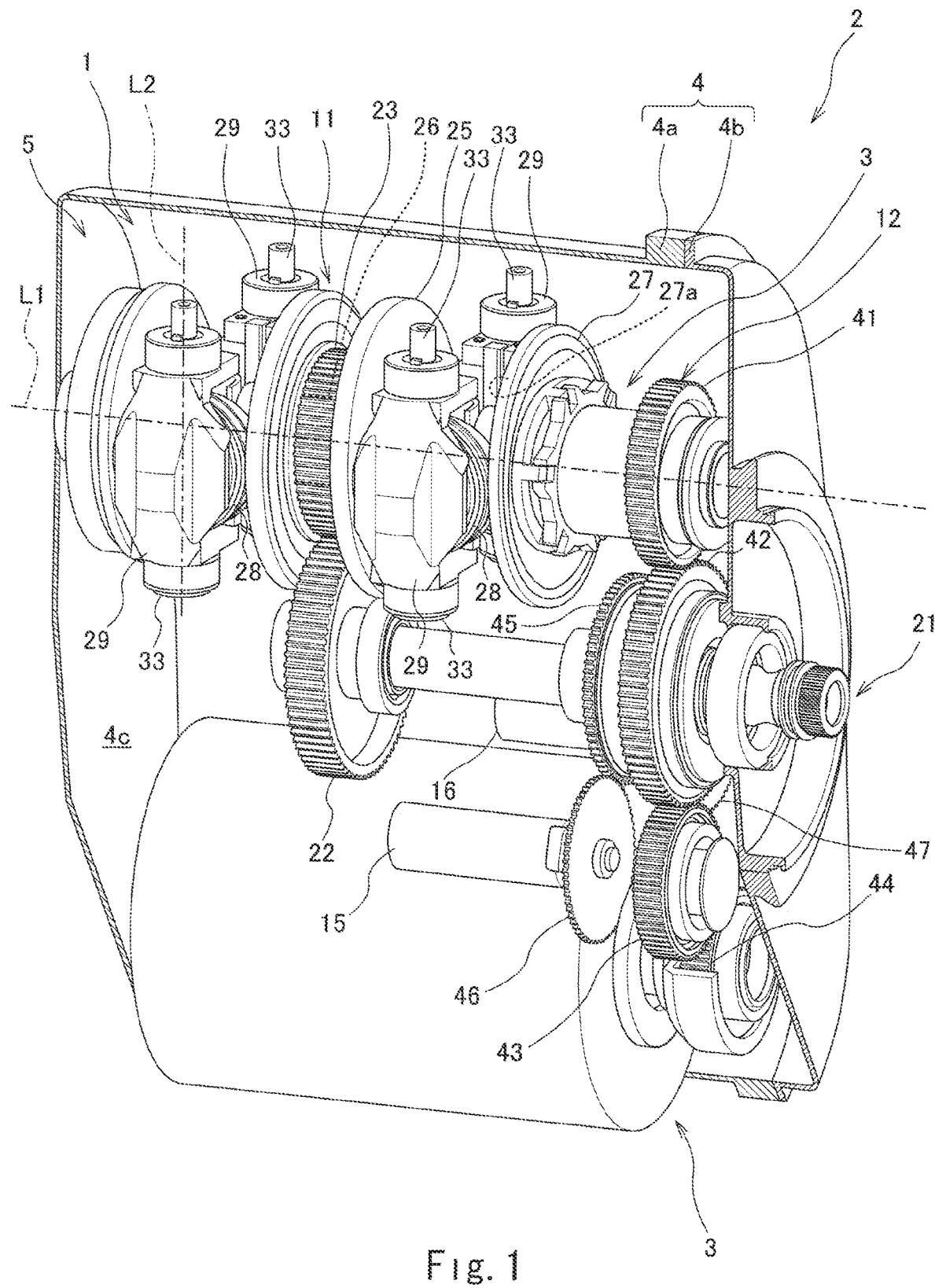
FIG. 1 is a sectional perspective view showing a casing of a power generation device according to Embodiment 1.
Figure 2:
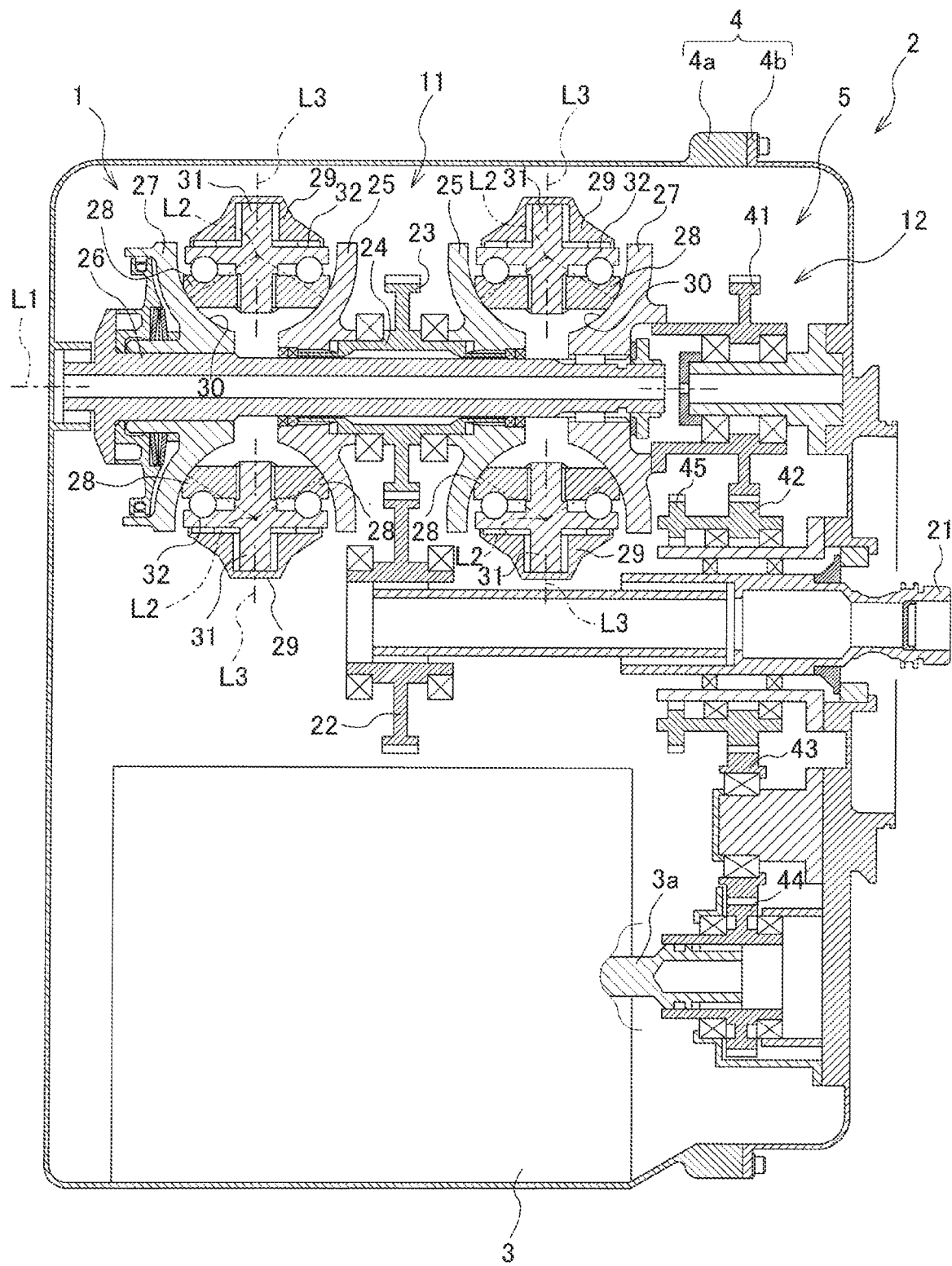
FIG. 2 is a schematic cross-sectional view of the power generation device of FIG. 1, which is taken along a cut plane of the casing and schematically shows a driving force transmission path of the power generation device.
Figure 3:
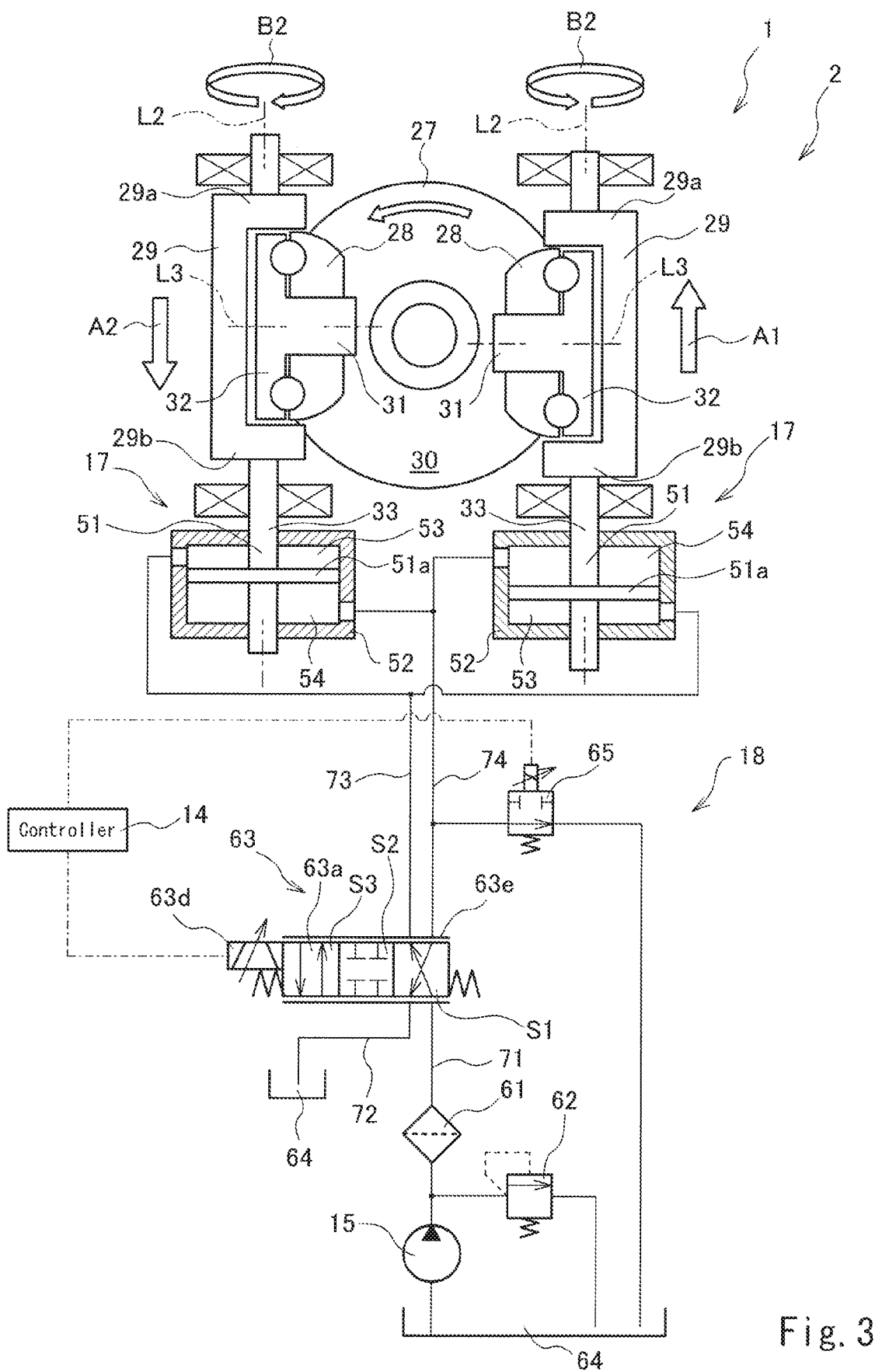
FIG. 3 is a circuit diagram showing a hydraulic circuit of a transmission device included in the power generation device according to Embodiment 1.

A power generation system 2 shown in FIGS. 1 to 3 is mounted in, for example, an engine (not shown) of an aircraft, and generates electric power by a rotational driving force transmitted from the engine to the power generation system 2. The power generation system 2 includes a transmission device 1, a generator 3, and a driving force transmission mechanism 12 which transmits the rotational driving force output from the transmission device 1 to the generator 3. The transmission device 1 has a function of changing the speed of the rotational driving force of the engine and transmitting the rotational driving force to the generator 3 and is configured to change a transmission ratio (transmission gear ratio) continuously (steplessly). The transmission device 1 include a toroidal continuously variable transmission (toroidal CVT) 11 (hereinafter also referred to as a "transmission 11"), a hydraulic actuation mechanism 13, and a controller 14. The generator 3, the transmission 11, and the hydraulic actuation mechanism 13 are accommodated in a casing 4 and constitute an integrated drive generator 5 (IDG) (hereinafter will also be referred to as "power generation device"). The controller 14 is disposed outside the casing 4.

The power generation device 5 includes a device input shaft 21 exposed from the casing 4. The rotational driving force transmitted from the engine to the device input shaft 21 is transmitted to the transmission 11 via a transmission gear 22. The transmission 11 is a traction drive continuously variable transmission (traction drive CVT). In the present embodiment, the transmission 11 is a double cavity half toroidal CVT. The transmission 11 includes a transmission input gear 23, a transmission input shaft 24, input discs 25, a transmission output shaft 26, output discs 27, power rollers 28, and trunnions 29.

As shown in FIG. 2, the device input shaft 21 is accommodated in the casing 4 in such a manner that the device input shaft 21 is rotatable around its center axis, and the first end portion of the device input shaft 21 protrudes outward from the casing 4. The first end portion of the device input shaft 21 is coupled to the engine. The device input shaft 21 rotates by the rotational driving force transmitted from the engine and input to the device input shaft 21. The transmission gear 22 is provided on the second end portion of the device input shaft 21, and is rotatable together with the device input shaft 21. The transmission gear 22 is in mesh with the transmission input gear 23. The transmission input gear 23 is integrally provided on the intermediate portion of the transmission input shaft 24 in an axial direction thereof. The transmission input shaft 24 is provided in the casing 4 in such a manner that the transmission input shaft 24 is rotatable around an axis (axis line) L1. The transmission input shaft 24 is rotatable by the rotational driving force transmitted from the device input shaft 21 to the transmission input shaft 24 via the transmission gear 22 and the transmission input gear 23. The input discs 25 are provided at the both ends, respectively, of the transmission input shaft 24 by, for example, spline-coupling in such a manner that the input discs 25 are rotatable together with the transmission input shaft 24. The transmission input shaft 24 has a hollow cylindrical shape. The transmission output shaft 26 is inserted into the inner hole of the transmission input shaft 24. The transmission output shaft 26 is provided in the casing 4 in such a manner that the transmission output shaft 26 is rotatable around the axis L1 and is rotatable independently of the transmission input shaft 24. The output discs 27 are provided on the both end portions, respectively, of the transmission output shaft 26, to correspond to the input discs 25, respectively. The output discs 27 are placed to face the corresponding input discs 25, respectively. The output discs 27 are rotatable together with the transmission output shaft 26 by, for example, spline-coupling. Between each of the output discs 27 and the corresponding input disc 25, a cavity 30 is formed. The cavities 30 are formed around the axis of the transmission output shaft 26, over an entire circumference of the transmission output shaft 26. Each of the cavities 30 has a semi-circular cross-section in the circumferential direction. In the cavity 30 with this shape, a pair of power rollers 28 are disposed. For easier understanding of the description, the positions of the pair of power rollers 28 are different between FIGS. 1 and 2. The pair of power rollers 28 are preferably disposed as shown in FIG. 1. However, the positions of the pair of power rollers 28 are not limited to those of FIG. 1 and may be those of FIG. 2. The same applies to the positions of the trunnion 29 and the positions of roller shafts 31.

The pair of power rollers 28 are disposed in the cavity 30 to be equally spaced apart from each other in the circumferential direction, namely, deviated from each other at 180 degrees. Each of the pair of power rollers 28 is a plate member with a substantially ring shape, and its outer peripheral surface has a partially spherical shape. The surface of the input disc 25 and the surface of the output disc 27, the surfaces facing each other, have cross-sections, respectively, with a semi-circular shape conforming to the shape of the outer peripheral surfaces of the power rollers 28. Each of the power rollers 28 is fitted between the input disc 25 and the output disc 27 and retained therebetween from the both sides in the axial direction. The roller shaft 31 is inserted into an inner hole 28a of each of the power rollers 28. Each of the power rollers 28 is rotatable around the roller shaft 31. The roller shaft 31 is integrated with a thrust bearing 32. The power roller 28 is rotatably supported on the trunnion 29 with the thrust bearing 32 interposed between the power roller 28 and the trunnion 29.

As shown in FIGS. 1 and 3, each of the trunnions 29 has a substantially-U shape. Each of the power rollers 28 is disposed between side walls 29a, 29b of the trunnion 29 and placed in a state in which the thrust bearing 32 is interposed between a body portion 29c and the power roller 28. The trunnion 29 includes shaft members 33 at the side walls 29a, 29b, respectively. The shaft members 33 are rotatably supported. In this configuration, the trunnion 29 is rotatable around the center axis (namely, rotational axis L2) of the shaft members 33. According to the rotation of the trunnion 29, the power roller 28 can be tilted, and the tilt motion angle of the power roller 28 can be changed (see arrows B1, B2 of FIG. 3 which will be described later). As defined herein, the tilt motion angle of the power roller 28 is an angle formed by the roller shaft 31 with respect to a line orthogonal to the axis of the transmission output shaft 26 in a plan view which is seen from a direction of the rotational axis L2.

Turning back to FIG. 2, in the transmission 11 configured as described above, the power roller 28 is in contact with each of the discs 25, 27 with a lubricating oil film (membrane) with a high viscosity interposed between the power roller 28 and each of the discs 25, 27. During the rotation, the lubricating oil film generates a fluid friction between each of the discs 25, 27 and the power roller 28. By the generated fluid friction, the power roller 28 rotates by the rotational driving force from the input disc 25, and rotates the output disc 27. In other words, the rotational driving force is transmitted from the input disc 25 to the output disc 27 via the power roller 28 and the lubricating oil film. The transmission 11 is configured to change the position at which the power roller 28 contacts each of the discs 25, 27. In the present embodiment, the transmission 11 is configured to change the tilt motion angle of the power roller 28 to change the transmission ratio of the rotational driving force transmitted from the input disc 25 to the output disc 27. Specifically, in the transmission 11, the speed of the rotational driving force input to the input disc 25 is charged in the transmission ratio corresponding to the tilt motion angle of the power roller 28, and then the rotational driving force is transmitted to the output disc 27. The output discs 27 to which the rotational driving force is transmitted in this way are attached on the end portions, respectively, of the transmission output shaft 26. The driving force transmission mechanism 12 is provided at one of the two output discs 27.

The driving force transmission mechanism 12 transmits the rotational driving force having been transmitted to the output disc 27, to the generator 3 and hydraulic pumps 15, 16 which are auxiliary units. The driving force transmission mechanism 12 includes a plurality of gears 41 to 47. The first gear 41 is coupled to one of the output discs 27 by, for example, spline-coupling, and is rotatable together with this output disc 27. The first gear 41 is in mesh with the second gear 42. The third gear 43 is in mesh with the second gear 42. The fourth gear 44 is in mesh with the third gear 43. The fourth gear 44 is mounted on a generator input shaft 3a of the generator 3. The fifth gear 45 is provided on the second gear 42 in such a manner that the fifth gear 45 is rotatable together with the second gear 42. As shown in FIG. 1, the sixth gear 46 and the seventh gear 47 are in mesh with the fifth gear 45, and are mounted on the input shaft of the hydraulic pump 15 and the input shaft of the hydraulic pump 16, respectively. In this way, the rotational driving force having been transmitted to the output disc 27 is input to the generator 3 and the hydraulic pumps 15, 16 via the first to seventh gears 41 to 47. The generator 3 generates electric power by the input rotational driving force. The hydraulic pumps 15, 16 are rotated by the input rotational driving force to discharge the hydraulic oil.

The transmission device 1 configured as described above further includes the trunnion drive mechanisms 17 and a hydraulic pressure supply device 18 of FIG. 3. The trunnion drive mechanisms 17 are provided to correspond to the trunnions 29, respectively. Each of the trunnion drive mechanisms 17 causes the corresponding trunnion 29 to perform a reciprocating motion in a speed reduction direction and in a speed increase direction along the rotational axis L2 thereof. The trunnion drive mechanism 17 having such a function includes a piston 51 and a cylinder 52 constituting a cylinder mechanism. The piston 51 is integrated with the shaft member 33 of the trunnion 29, and is inserted into the cylinder 52. The piston 51 has on an outer peripheral surface of an intermediate portion, a pressure receiving section 51a extending over the entire circumference and protruding radially outward. The pressure receiving section 51a partitions the interior of the cylinder 52 into a speed reduction chamber 53 and a speed increase chamber 54.

As described above, the trunnion drive mechanisms 17 are provided to correspond to the trunnions 29, respectively. Two trunnion drive mechanisms 17 are provided for the pair of discs 25, 27. The two trunnion drive mechanisms 17 displace the two trunnions 29 in opposite directions. For example, when one of two trunnion drive mechanisms 17 advances the piston 51 (see arrow A1 of FIG. 3), the other of the two trunnion drive mechanisms 17 retracts the piston 51 (see arrow A2 of FIG. 3). Therefore, between the two trunnion drive mechanisms 17, the position of the speed reduction chamber 53 and the position of the speed increase chamber 54 inside the cylinder 52 are reversed. Specifically, the speed reduction chamber 53 of one of the two trunnion drive mechanisms 17 is located closer to the trunnion 29 than the pressure receiving section 51a, while the speed increase chamber 54 of the other of the two trunnion drive mechanisms 17 is located closer to the trunnion 29 than the pressure receiving section 51a. In one of the two trunnion drive mechanisms 17, a direction in which the piston 51 is advanced is the speed reduction direction. In the other of the two trunnion drive mechanisms 17, a direction in which the piston 51 is retracted is the speed reduction direction. In one of the two trunnion drive mechanisms 17, a direction in which the piston 51 is retracted is the speed increase direction. In the other of the two trunnion drive mechanisms 17, a direction in which the piston 51 is advanced is the speed increase direction.

In the above-described manner, each of the trunnion drive mechanisms 17 advances or retracts the piston 51 in the speed reduction direction or in the speed increase direction to move the trunnion 29 in the speed reduction direction or in the speed increase direction. Each of the trunnion drive mechanisms 17 is a hydraulic cylinder mechanism. In a case where the hydraulic oil is supplied to the speed reduction chamber 53, the trunnion 29 is moved in the speed reduction direction and the power roller 28 is tilted, so that the transmission ratio is increased. In a case where the hydraulic oil is supplied to the speed increase chamber 54, the trunnion 29 is moved in the speed increase direction and the power roller 28 is tilted, so that the transmission ratio is reduced. The hydraulic pressure supply device 18 supplies the hydraulic oil to each of the trunnion drive mechanisms 17.

The hydraulic pressure supply device 18 includes as major constituents the above-described hydraulic pump 15, a filter 61, a relief valve 62, a direction selector valve 63, a tank 64, and a discharge valve 65. As described above, the hydraulic pump 15 is actuated by the rotational driving force transmitted via the transmission 11 and the driving force transmission mechanism 12 and input to the hydraulic pump 15, to discharge the hydraulic oil. The hydraulic pump 15 is connected to a main passage 71, and the discharged hydraulic oil flows through the main passage 71. The filter 61 is placed in the main passage 71 to remove the foreign matters from the hydraulic oil. The relief valve 62 is provided in a branch portion of the main passage 71 at a location which is upstream of the filter 61. When a pressure in the main passage 71 exceeds a predetermined relief pressure, the relief valve 62 releases the hydraulic oil to the tank 64. The direction selector valve 63 is connected to the main passage 71 at a location which is downstream of the filter 61.

The direction selector valve 63 is an electric hydraulic servo valve (e.g., flapper nozzle valve) including a spool 63a and has four ports. The position of the spool 63a is changeable. Depending on the position of the spool 63a, the connected states of the four ports are changed. The main passage 71, a tank passage 72, a speed reduction passage 73 and a speed increase passage 74 are connected to the four ports, respectively. The tank passage 72 is connected to the tank 64. The speed reduction passage 73 is connected to the speed reduction chamber 53 of each of the trunnion drive mechanisms 17. The speed increase passage 74 is connected to the speed increase chamber 54 of each of the trunnion drive mechanisms 17. The spool 63a is provided with an electromagnetic pilot mechanism 63d for adjusting the position of the spool 63a. The electromagnetic pilot mechanism 63d includes, for example, an electromagnetic pilot valve. The electromagnetic pilot mechanism 63d applies to the spool 63a a pilot pressure corresponding to a speed change signal input to the electromagnetic pilot valve. The spool 63a is movable to a position corresponding to the pilot pressure.

The spool 63a is movable among three positions, specifically, first to third positions S1 to S3, according to the pilot pressure applied to the spool 63a. At the first position, via the spool 63a, the main passage 71 is connected to the speed reduction passage 73 and the tank passage 72 is connected to the speed increase passage 74. At the second position, all of the four ports are shut-off (closed). In other words, all of the four passages 71 to 74 are shut-off (closed). At the third position, the main passage 71 is connected to the speed increase passage 74, and the tank passage 72 is connected to the speed reduction passage 73. More specifically, in a state in which the speed change signal is not input to the electromagnetic pilot mechanism 63d (e.g., the power supply to the electromagnetic pilot mechanism 63d is OFF), the spool 63a is at the first position S1. When the speed change signal is input to the electromagnetic pilot mechanism 63d and the pilot pressure increases, the spool 63a moves toward the second position S2 while reducing the opening area of each of the ports. When the spool 63a reaches the second position, each of the ports is shut-off. When the pilot pressure further increases after the spool 63a has reached the second position, the connection states of the four ports are changed so that the main passage 71 is connected to the speed increase passage 74, and the tank passage 72 is connected to the speed reduction passage 73. The spool 63a moves toward the third position S3 while increasing the opening area of each of the ports.

In the hydraulic pressure supply device 18 configured as described above, the direction selector valve 63 changes the flow direction of the hydraulic oil in response to the speed change signal input to the direction selector valve 63 to supply the hydraulic oil to one of the speed reduction chamber 53 and the speed increase chamber 54. By the supply of the hydraulic oil, the piston 51 of each of the trunnion drive mechanisms 17 is advanced or retracted, and thus the trunnion 29 moves in the speed reduction direction or in the speed increase direction. Thereby, the power roller 28 is tilted and the transmission ratio is changed. Thereafter, when the hydraulic oil is supplied to one of the chambers at a flow rate corresponding to the speed change signal, a sleeve 63c included in the direction selector valve 63 as the servo valve shuts-off (closes) the four passages 71 to 74 to maintain the position of the trunnion 29. In this way, the transmission ratio set in the transmission 11 is maintained at the transmission ratio corresponding to the speed change signal. In contrast, the main passage 71 is shut-off (closed) by the direction selector valve 63, which causes an increase in the hydraulic pressure in the main passage 71. With the increase in the hydraulic pressure, the relief vale 62 opens and the hydraulic oil is discharged from the main passage 71 toward the tank 64. The discharge valve 65 is connected to the speed increase passage 74 to discharge the hydraulic oil to the tank 64.

The discharge valve 65 is a normally open electromagnetic on-off valve. The discharge valve 65 connects the speed increase passage 74 and the tank 64 to each other and disconnects the speed increase passage 74 and the tank 64 from each other. More specifically, the discharge valve 65 can receive a disconnection signal as an input. In response to the disconnection signal input to the discharge valve 65, the discharge valve 65 disconnects the speed increase passage 74 and the tank 64 from each other. When the discharge valve 65 ceases to receive the disconnection signal as the input, the discharge valve 65 connects the speed increase passage 74 to the tank 64, and discharges the hydraulic oil from the speed increase chamber 54 of each of the trunnion drive mechanisms 17 to the tank 64. In a case where the speed increase passage 74 is connected to the main passage 71 via the direction selector valve 63, the discharge valve 65 also discharges to the tank 64 the hydraulic oil discharged from the hydraulic pump 15. In this way, the discharge valve 65 discharges the hydraulic oil from the speed increase chamber 54, irrelevantly of the position of the direction selector valve 63.

The discharge valve 65 operating as described above discharges the hydraulic oil from the speed increase chamber 54 and ceases to supply the hydraulic oil from the hydraulic pump 15 to the speed increase chamber 54. Therefore, the piston 51 of each of the trunnion drive mechanisms 17 is advanced toward or retracted from the speed reduction chamber 53. This allows the trunnion 29 to move in the speed reduction direction and reach a maximum speed reduction position. As a result, the power roller 28 is tilted to a maximum speed reduction angle. Thus, the transmission ratio set in the transmission 11 is increased to a maximum speed reduction ratio (maximum reduction gear ratio). The speed of the rotational driving force input to the input disc 25 is sufficiently reduced in the maximum speed reduction ratio, and then the rotational driving force with the reduced speed is input to the generator 3. By setting the transmission ratio of the transmission 11 to the maximum speed reduction ratio in this way, a situation in which the rotational speed of the generator 3 becomes an allowable rotational speed or higher can be prevented. The discharge valve 65 operating in the above-described manner is electrically connected to the controller 14.

The controller 14 is also electrically connected to the direction selector valve 63. The controller 14 outputs the speed change signal and the disconnection signal to the valves 63, 65 to control the movements of the valves 63, 65, respectively. A rotational speed sensor 19 is connected to the controller 14. The rotational speed sensor 19 outputs a signal corresponding to the rotational speed of the output side, the speed of which has been changed by the transmission 11. The rotational speed sensor 19 is disposed in a driving force transmission path from the transmission output shaft 26 to the generator 3. For example, in the present embodiment, the rotational speed sensor 19 is attached on the third gear 43. The controller 14 detects the rotational speed of the output side of the transmission 11 based on the signal output from the rotational speed sensor 19.

In the controller 14 configured as described above, a target rotational speed is preset therein, or input thereto. The controller 14 is configured to control the movement of the direction selector valve 63 so that the rotational speed detected based on the signal output from the rotational speed sensor 19 reaches the target rotational speed. Also, an allowable rotational speed which is higher than the target rotational speed is preset in or input to the controller 14. The controller 14 determines whether or not a predetermined discharge condition is met based on the rotational speed detected based on the signal of the rotational speed sensor 19 and the allowable rotational speed. The predetermined discharge condition is defined as, for example, a condition in which the detected rotational speed is higher than the allowable rotational speed. The controller 14 is configured to control the movement of the discharge valve 65 depending on whether or not the predetermined discharge condition is met.

In the power generation system 2 configured as described above, the rotational driving force of the engine (not shown) is input to the device input shaft 21 of the transmission device 1, and then is input to the generator 3 via the transmission 11 and the driving force transmission mechanism 12. The generator 3 generates the electric power by the rotational driving force with a predetermined rotational speed which is input to the generator 3. In the transmission device 1, the transmission ratio set in the transmission 11 is adjusted so that the rotational driving force with the target rotational speed corresponding to the predetermined rotational speed is output to the generator 3. Specifically, the controller 14 detects the rotational speed based on the signal from the rotational speed sensor 19, and calculates a deviation between the detected rotational speed and the target rotational speed. The controller 14 outputs the speed change signal corresponding to this deviation to the direction selector valve 63 to change the position of the spool 63a and adjust the transmission ratio. The controller 14 adjusts the transmission ratio so that the detected rotational speed reaches the target rotational speed. As described above, the transmission device 1 adjusts the rotational speed of the rotational driving force to be input to the generator 3 into the predetermined rotational speed, and the generator 3 generates the electric power by this rotational driving force.

Depending on situations, the transmission device 1 cannot adjust the rotational speed of the rotational driving force to be input to the generator 3 into the predetermined rotational speed. For example, it is assumed that the spool 63a of the direction selector valve 63 remains unmovable. If the spool 63a is located closer to the third position S3 than the second position S2 and remains unmovable, the trunnion 29 is moved in the speed increase direction. In that case, the speed of the rotational driving force input to the device input shaft 21 is increased by the transmission 11 and then the rotational driving force with the increased speed is input to the generator 3. If the speed of the rotational driving force continues to be increased, the rotational speed of the output side is increased. Soon, the detected rotational speed exceeds the allowable rotational speed. In this state, the controller 14 determines that the discharge condition is met, and ceases to output the disconnection signal to the discharge valve 65. As a result, the hydraulic oil is discharged from the speed increase chamber 54 of each of the trunnion drive mechanisms 17 and the transmission ratio set in the transmission 11 is increased to the maximum speed reduction ratio (maximum reduction gear ratio). This makes it possible to prevent a situation in which the rotational speed of the generator 3 is excessively increased and the generator 3 is rotated at an undesired rotational speed.

The power generation system 2 is capable of reducing the rotational speed of the generator 3 while maintaining a state in which the rotational driving force is input to the device input shaft 21. In other words, the power generation system 2 is capable of reducing the rotational speed of the generator 3 without deactivating the engine. For this reason, the power generation system 2 is especially suitably used in a vehicle which cannot deactivate the engine, such as the aircraft.

Embodiment 2

A transmission device 1A according to Embodiment 2 has a configuration similar to that of the transmission device 1 according to Embodiment 1. Hereinafter, regarding the configuration of the transmission device 1A according to Embodiment 2, differences from the configuration of the transmission device 1 according to Embodiment 1 will be mainly described, and the same constituents as those of the transmission device 1 according to Embodiment 1 are designated by the same reference symbols and will not be described repeatedly. The same applies to transmission devices 1B to 1F of Embodiment 3 to Embodiment 7.

Figure 4:
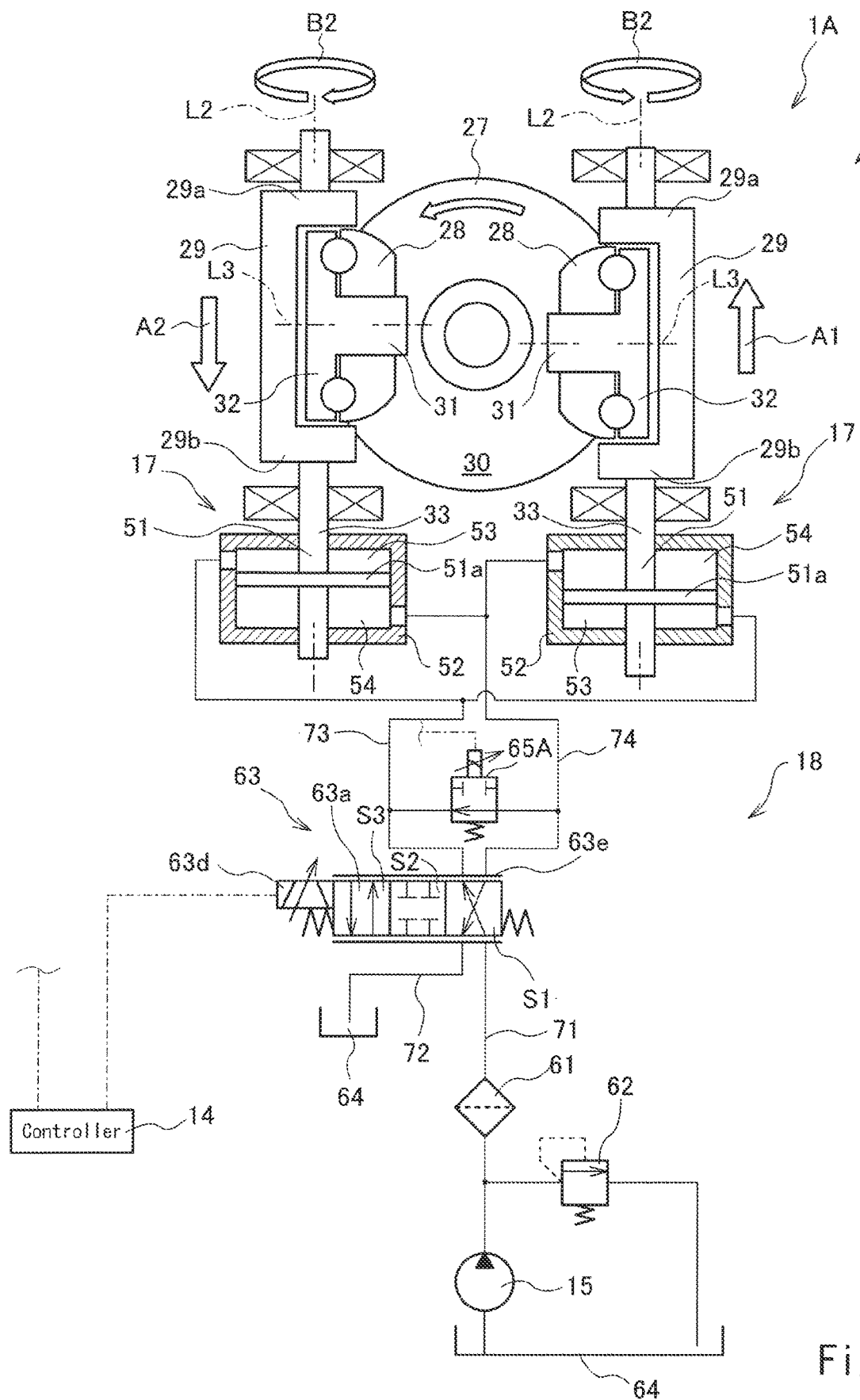
FIG. 4 is a circuit diagram showing a hydraulic circuit of a transmission device included in a power generation device according to Embodiment 2.

As shown in FIG. 4, in the transmission device 1A according to Embodiment 2, the hydraulic pressure supply device 18 includes a discharge valve 65A. The discharge valve 65A is a normally open electromagnetic on-off valve. The discharge valve 65A is connected to the speed reduction passage 73 and the speed increase passage 74 and is configured to connect the speed reduction passage 73 and the speed increase passage 74 to each other or disconnect the speed reduction passage 73 and the speed increase passage 74 from each other. When the discharge valve 65A receives the disconnection signal as the input, the discharge valve 65A disconnects the speed reduction passage 73 and the speed increase passage 74 from each other. On the other hand, when the discharge valve 65A ceases to receive the disconnection signal as the input, the discharge valve 65A connects the speed reduction passage 73 and the speed increase passage 74 to each other.

In the transmission device 1A configured as described above, in a case where the controller 14 determines that the discharge condition is not met, the controller 14 outputs the disconnection signal to the discharge valve 65A. On the other hand, in a case where the controller 14 determines that the discharge condition is met, the controller 14 ceases to output the disconnection signal to the discharge valve 65A. In response to this, the discharge valve 65A connects the speed reduction passage 73 and the speed increase passage 74 to each other. During the operation of the CVT such as the transmission 11, if a load (a load from the hydraulic pumps 15, 16) is applied to the output disc 27, a loading force corresponding to this load applied to the output disc 27 acts on the power roller 28 in a direction in which the trunnion 29 is moved in the speed reduction direction. In other words, the piston 51 is pushed toward the speed increase chamber 54. Since the discharge valve 65A connects the speed reduction passage 73 and the speed increase passage 74 to each other, the hydraulic oil is discharged from the speed increase chamber 54 of each of the trunnion drive mechanisms 17 to the speed reduction chamber 53.

As described above, in the transmission device 1A, the discharge valve 65A connects the speed reduction passage 73 and the speed increase passage 74 to each other to discharge the hydraulic oil from the speed increase chamber 54 to the speed reduction chamber 53. This allows the transmission device 1A according to Embodiment 2 to more quickly increase the transmission ratio (transmission gear ratio) set in the transmission 11 to the maximum speed reduction ratio than the transmission device 1 according to Embodiment 1. As a result, it becomes possible to prevent a situation in which the rotational speed of the generator 3 is excessively increased and the generator 3 is rotated at an undesired rotational speed.

The transmission device 1A according to Embodiment 2 can obtain advantages similar to those of the transmission device 1 according to Embodiment 1.

Embodiment 3

A transmission device 1B according to Embodiment 3 has a configuration similar to that of the transmission device 1A according to Embodiment 2.

Figure 5:
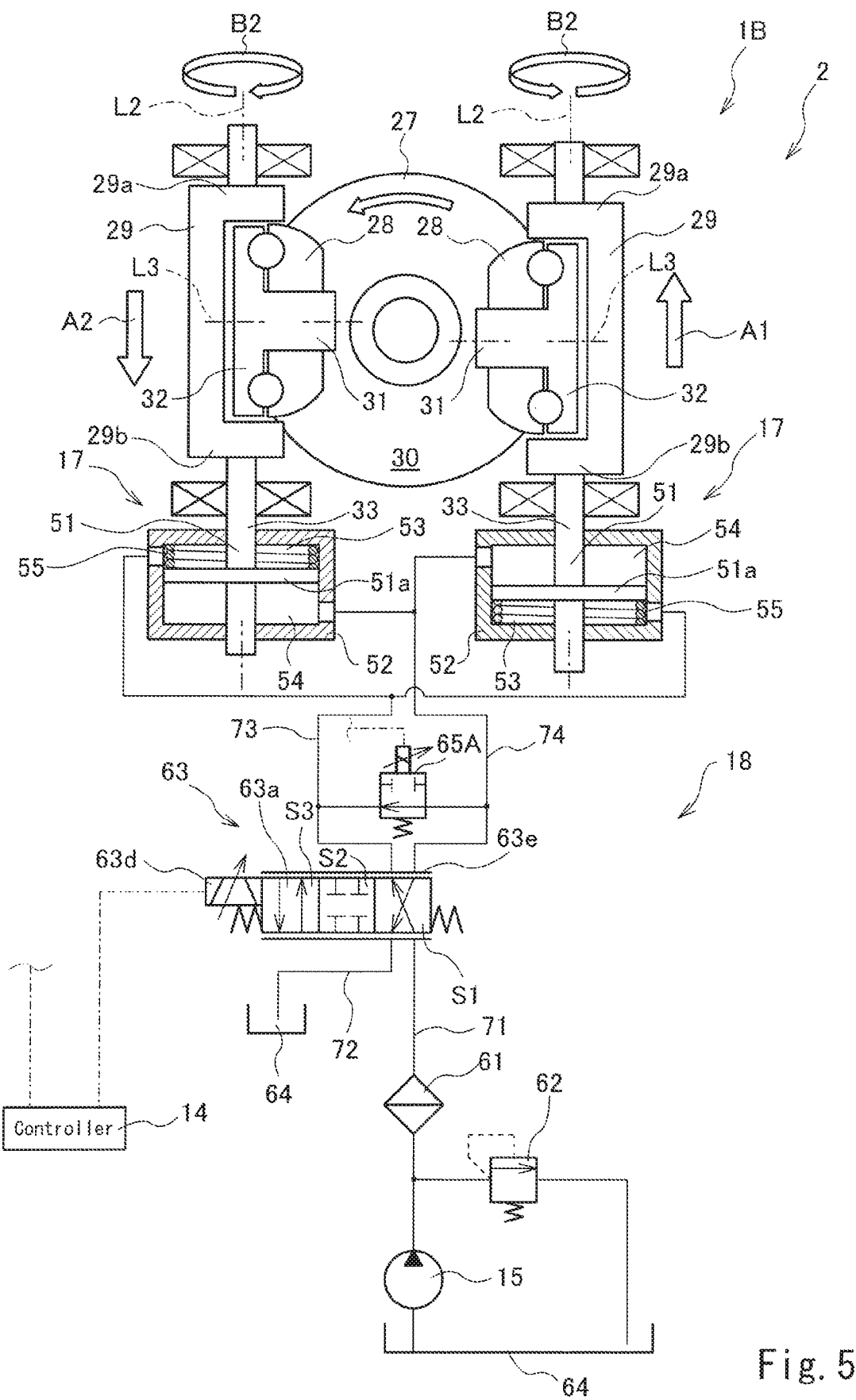
FIG. 5 is a circuit diagram showing a hydraulic circuit of a transmission device included in a power generation device according to Embodiment 3.

As shown in FIG. 5, in the transmission device 1B according to Embodiment 3, a compression coil spring 55 which is an elastic member is accommodated in the speed reduction chamber 53 of each of the trunnion drive mechanisms 17. The compression coil spring 55 biases the pressure receiving section 51a of the piston 51 toward the speed increase chamber 54 (namely, in the speed reduction direction). Therefore, when the controller 14 ceases to output the disconnection signal to the discharge valve 65A to connect the speed reduction passage 73 and the speed increase passage 74 to each other, the hydraulic oil can be more positively discharged from the speed increase chamber 54 to the speed reduction chamber 53. This allows the transmission device 1B according to Embodiment 3 to more quickly increase the transmission ratio set in the transmission 11 to the maximum speed reduction ratio than the transmission device 1A according to Embodiment 2. As a result, it becomes possible to prevent a situation in which the rotational speed of the generator 3 is excessively increased and the generator 3 is rotated at an undesired rotational speed.

The transmission device 1B according to Embodiment 3 can obtain advantages similar to those of the transmission device 1 according to Embodiment 2.

Embodiment 4

A transmission device 1C according to Embodiment 4 has a configuration similar to that of the transmission device 1A according to Embodiment 2.

Figure 6:
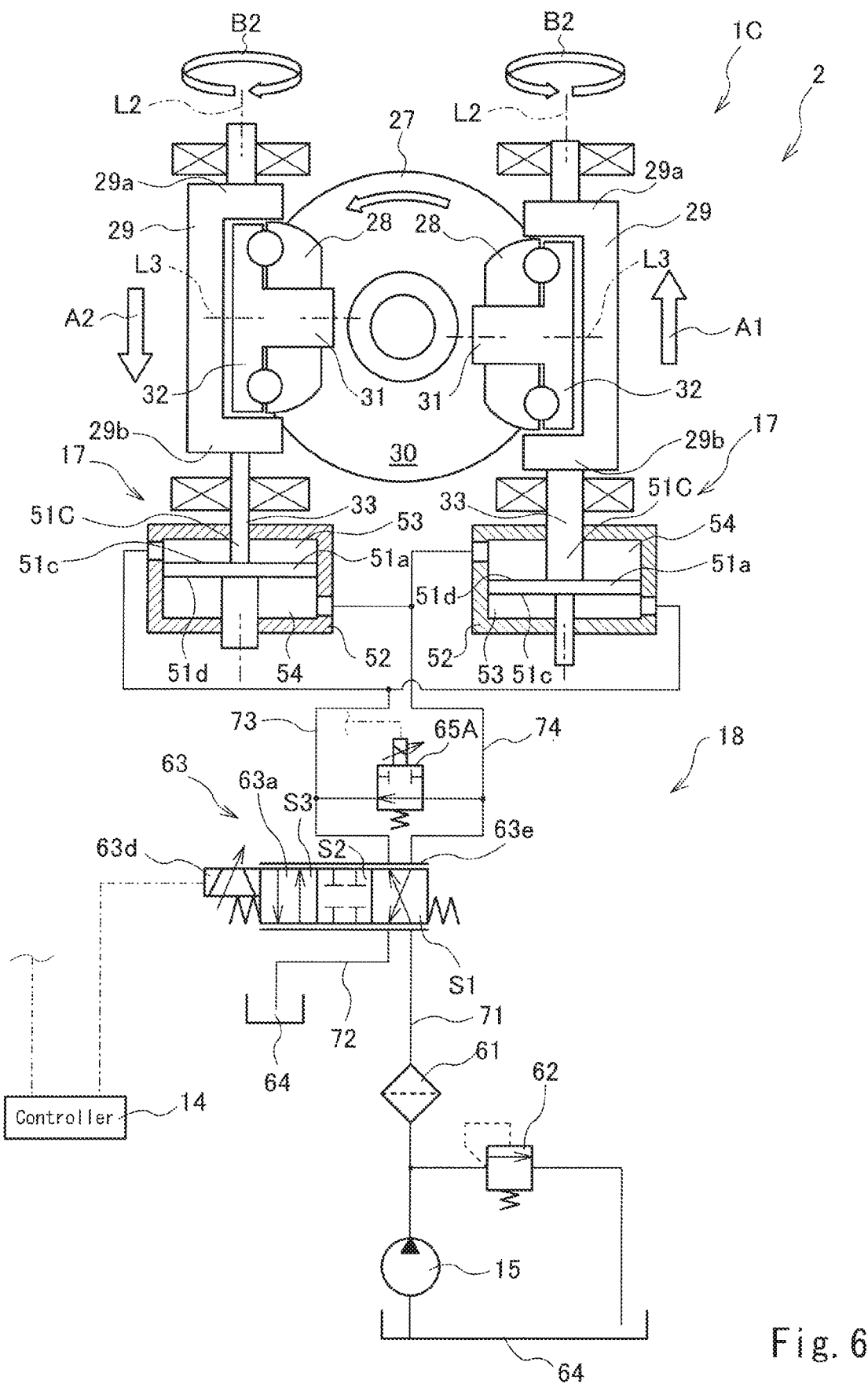
FIG. 6 is a circuit diagram showing a hydraulic circuit of a transmission device included in a power generation device according to Embodiment 4.

As shown in FIG. 6, in the transmission device 1C according to Embodiment 4, a pressure receiving section 51a of a piston 51C includes a speed reduction pressure receiving surface 51b located closer to the speed reduction chamber 53, and a speed increase pressure receiving surface 51c located closer to the speed increase chamber 54. The speed reduction pressure receiving surface 51b receives a load for moving the piston 51 in the speed reduction direction, from the hydraulic pressure in the speed reduction chamber 53. The speed increase pressure receiving surface 51c receives a load for moving the piston 51 in the speed increase direction, from the hydraulic pressure in the speed increase chamber 54. The speed reduction pressure receiving surface 51*b* has a pressure receiving area larger than that of the speed increase pressure receiving surface 51*c*. Therefore, when the controller 14 ceases to output the disconnection signal to the discharge valve 65A to connect the speed reduction passage 73 and the speed increase passage 74 to each other, and the hydraulic pressure in the speed reduction chamber 53 and the hydraulic pressure in the speed increase chamber 54 become substantially equal to each other, the pressure receiving section 51*a* is pushed by the speed increase chamber 54. Therefore, the hydraulic oil can be more positively discharged from the speed increase chamber 54 and guided to the speed reduction chamber 53. This allows the transmission device 1C according to Embodiment 4 to more quickly increase the transmission ratio set in the transmission 11 to the maximum speed reduction ratio than the transmission device 1A according to Embodiment 2. As a result, it becomes possible to prevent a situation in which the rotational speed of the generator 3 is excessively increased and the generator 3 is rotated at an undesired rotational speed.

The transmission device 1C according to Embodiment 4 can obtain advantages similar to those of the transmission device 1A according to Embodiment 2.

Embodiment 5

A transmission device 1D according to Embodiment 5 has a configuration similar to that of the transmission device 1 according to Embodiment 1.

Figure 7:
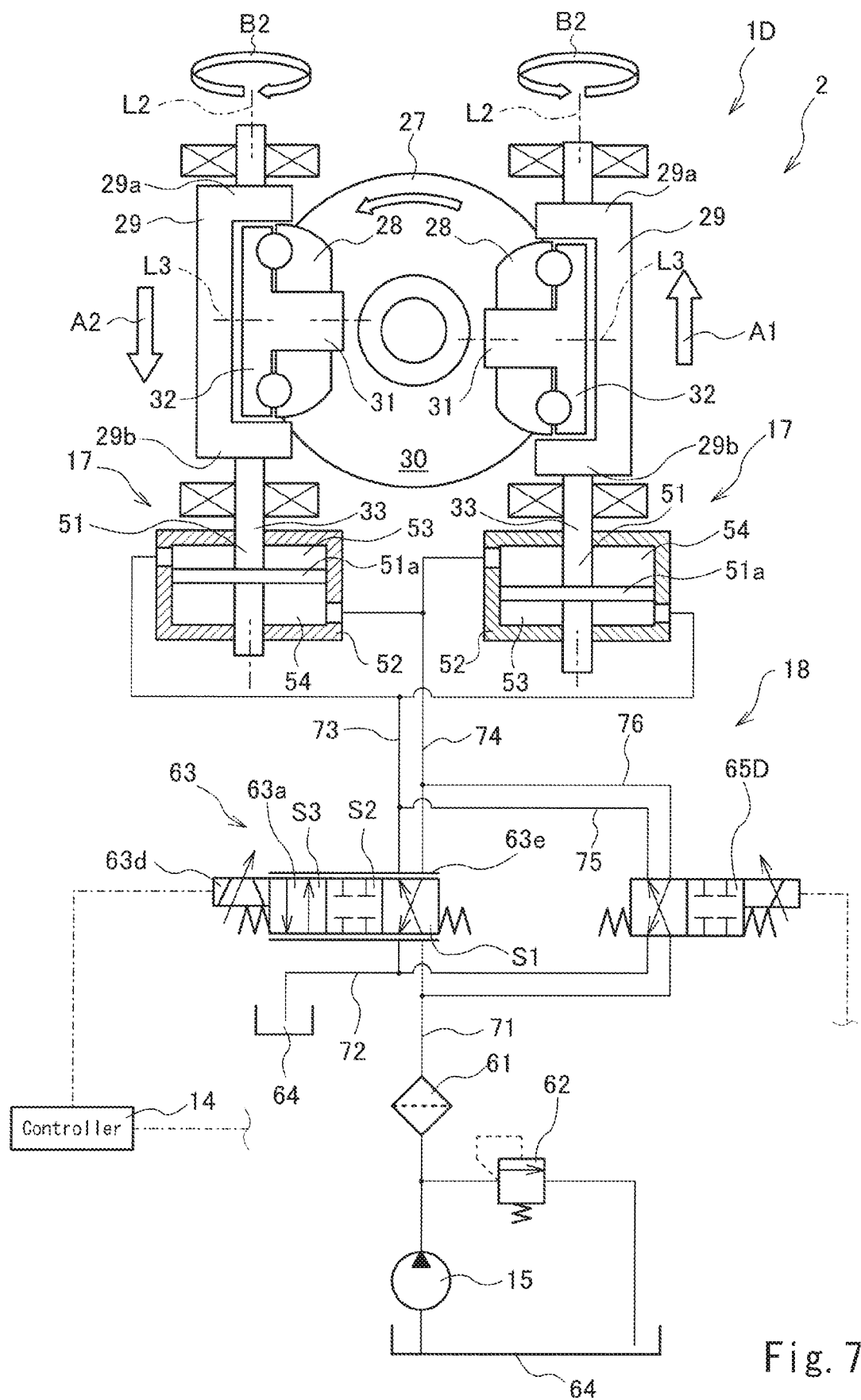
FIG. 7 is a circuit diagram showing a hydraulic circuit of a transmission device included in a power generation device according to Embodiment 5.

As shown in FIG. 7, in the transmission device 1D according to Embodiment 5, the hydraulic pressure supply device 18 includes an electromagnetic on-off valve 65D. The electromagnetic on-off valve 65D which is a supply valve and a discharge valve includes four ports. The four ports are connected to the main passage 71, the tank passage 72, the speed reduction passage 73 and the speed increase passage 74, respectively. The electromagnetic on-off valve 65D is connected to the controller 14 and receives a supply/discharge signal as an input from the controller 14. When the electromagnetic on-off valve 65D receives the supply/discharge signal as the input, the electromagnetic on-off valve 65D shuts-off (closes) all of the four passages 71 to 74. On the other hand, when the electromagnetic on-off valve 65D ceases to receive the supply/discharge signal as the input, the electromagnetic on-off valve 65D connects the main passage 71 and the speed reduction passage 73 to each other and connects the tank passage 72 and the speed increase passage 74 to each other. In the connected states of the passages 71 to 74, a pressure loss in the electromagnetic on-off valve 65D is less than a pressure loss in the direction selector valve 63.

In the transmission device 1D configured as described above, in a case where the controller 14 determines that the discharge condition is not met, the controller 14 outputs the discharge signal to the electromagnetic on-off valve 65D. On the other hand, in a case where the controller 14 determines that the discharge condition is met, the controller 14 ceases to output the discharge signal to the electromagnetic on-off valve 65D. Thus, a supply bypass passage 75 is formed between the main passage 71 and the speed reduction passage 73, with the electromagnetic on-off valve 65D interposed between the main passage 71 and the speed reduction passage 73, and the main passage 71 and the speed reduction passage 73 are connected to each other via the supply bypass passage 75. In addition, a discharge bypass passage 76 is formed between the tank passage 72 and the speed increase passage 74, and the tank passage 72 and the speed increase passage 74 are connected to each other via the discharge bypass passage 76. Since a pressure loss in the electromagnetic on-off valve 65D is less than a pressure loss in the direction selector valve 63, the hydraulic oil discharged from the hydraulic pump 15 is guided to the speed reduction chamber 53 via the supply bypass passage 75, and the hydraulic oil is discharged from the speed increase chamber 54 to the tank 64 via the discharge bypass passage 76, in the connected states of the passages 71 to 74.

As described above, in the transmission device 1D, the electromagnetic on-off valve 65D causes the passages 71 to 74 to be in the connected states so that the hydraulic oil is supplied to the speed reduction chamber 53 and the hydraulic oil is discharged from the speed increase chamber 54. This allows the transmission device 1D according to Embodiment 5 to more quickly increase the transmission ratio set in the transmission 11 to the maximum speed reduction ratio than the transmission device 1 according to Embodiment 1. As a result, it becomes possible to prevent a situation in which the rotational speed of the generator 3 is excessively increased and the generator 3 is rotated at an undesired rotational speed.

The transmission device 1D according to Embodiment 5 can obtain advantages similar to those of the transmission device 1 according to Embodiment 1.

Embodiment 6

A transmission device 1E according to Embodiment 6 has a configuration similar to that of the transmission device 1D according to Embodiment 5.

Figure 8:
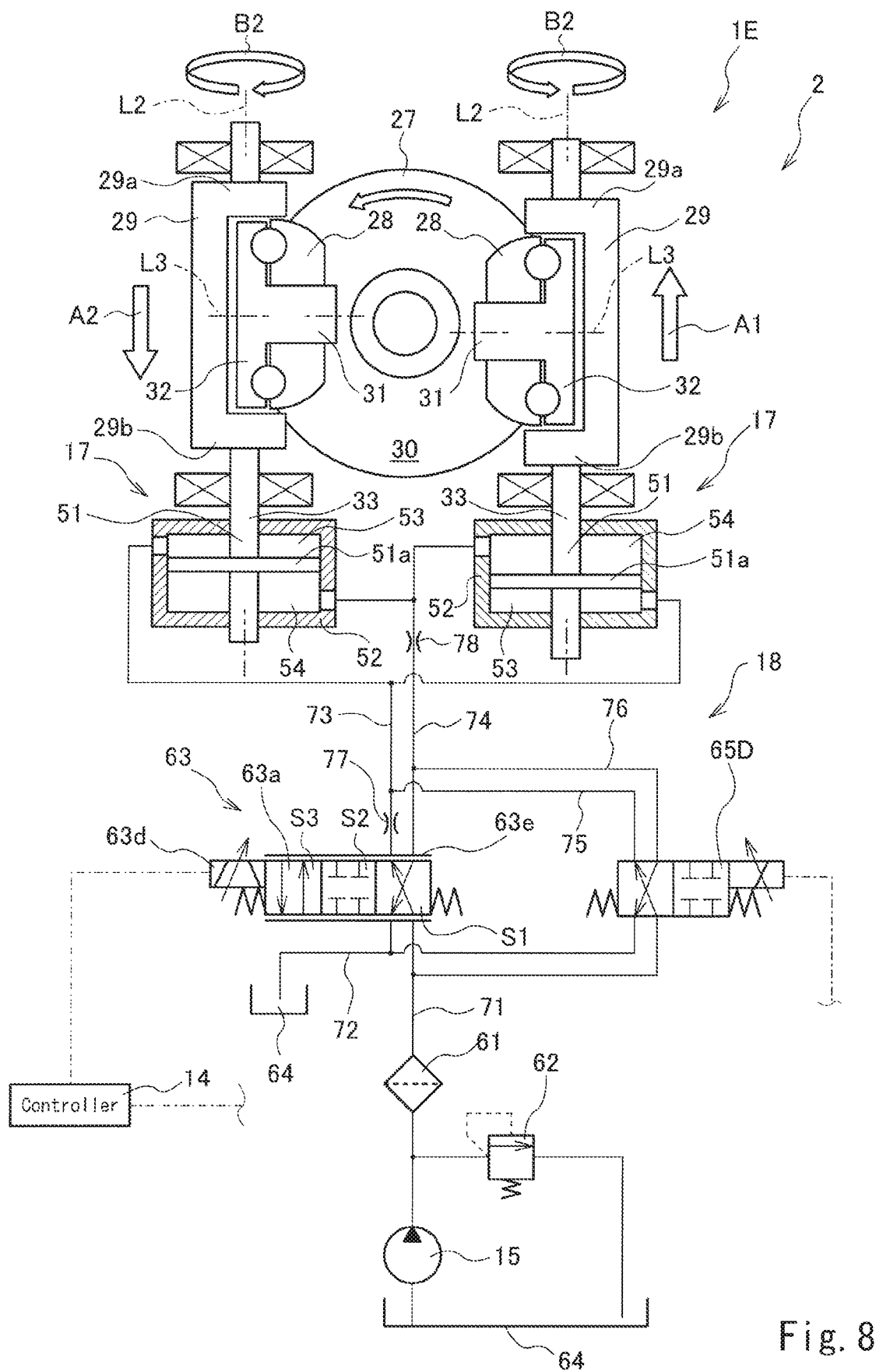
FIG. 8 is a circuit diagram showing a hydraulic circuit of a transmission device included in a power generation device according to Embodiment 6.

As shown in FIG. 8, in the transmission device 1E according to Embodiment 6, a speed reduction chamber throttle 77 is provided in the speed reduction passage 73, and a speed increase chamber throttle 78 is provided in the speed increase passage 74. The electromagnetic on-off valve 65D is connected to the speed reduction passage 73 at a location which is rearward of the speed reduction chamber throttle 77 (closer to the trunnion drive mechanism 17) and connected to the speed increase passage 74 at a location which is forward of the speed increase chamber throttle 78 (closer to the direction selector valve 63). This causes an increases in a pressure loss in the passage which flows the hydraulic oil to the speed reduction chamber 53 and the speed increase chamber 54 through the direction selector valve 63. In contrast, a pressure loss in the passage which flows the hydraulic oil to the speed reduction chamber 53 and the speed increase chamber 54 through the supply bypass passage 75 and the discharge bypass passage 76 is less than the pressure loss in the passage which flows the hydraulic oil to the speed reduction chamber 53 and the speed increase chamber 54 through the direction selector valve 63. For this reason, the pressure loss in the electromagnetic on-off valve 65D can be made less than that in the transmission device 1E according to Embodiment 5, and the size of the electromagnetic on-off valve 65D can be reduced. As a result, the size of the transmission device 1E can be reduced.

The transmission device 1E according to Embodiment 6 can obtain advantages similar to those of the transmission device 1D according to Embodiment 5.

Embodiment 7

A transmission device 1F according to Embodiment 7 has a configuration similar to that of the transmission device 1 according to Embodiment 1.

Figure 9:
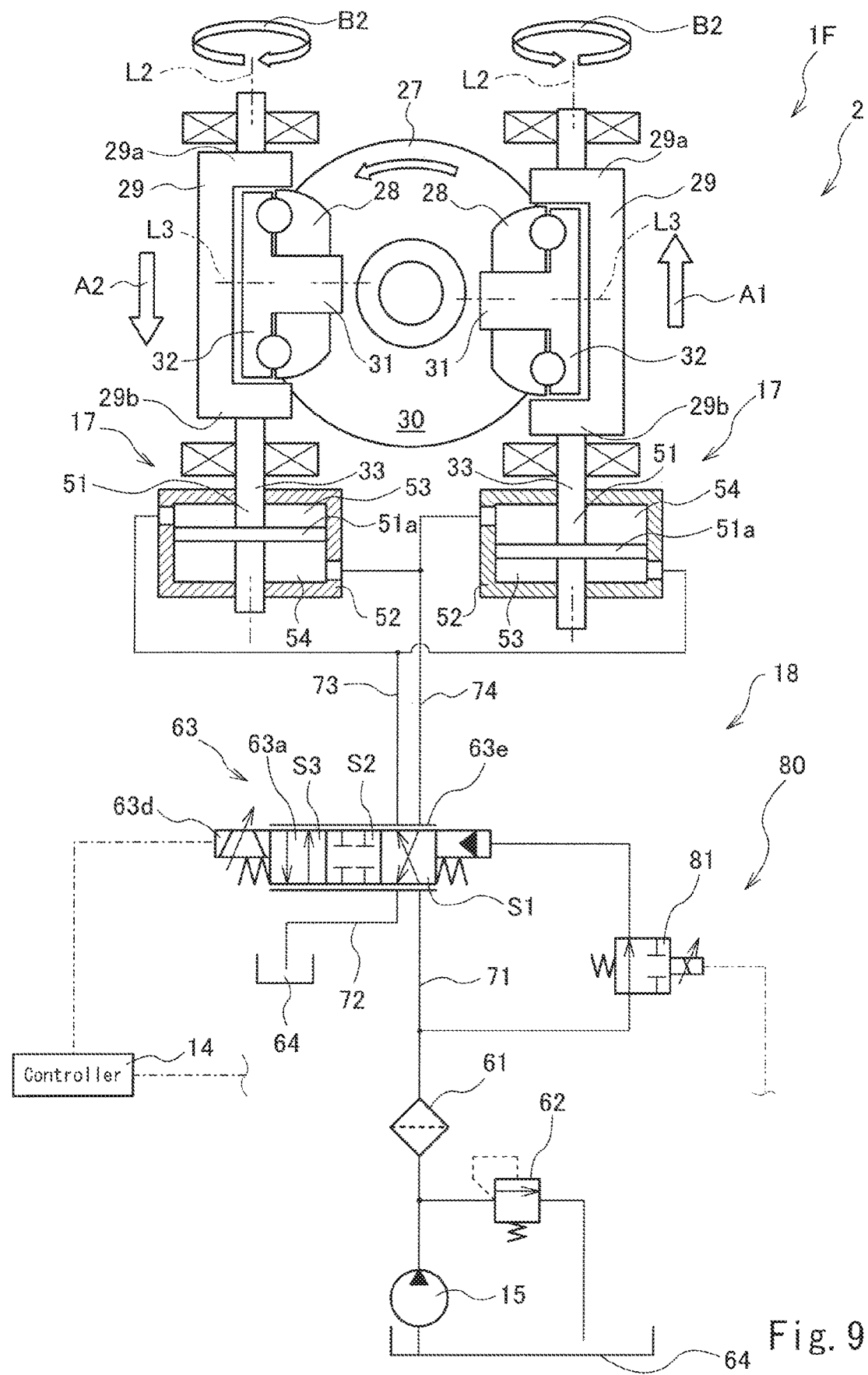
FIG. 9 is a circuit diagram showing a hydraulic circuit of a transmission device included in a power generation device according to Embodiment 7.

As shown in FIG. 9, in the transmission device 1F, the hydraulic pressure supply device 18 includes a pressure application mechanism 80. The pressure application mechanism 80 includes an electromagnetic pilot valve 81. The electromagnetic pilot valve 81 is configured to receive a pressure signal as an input. The electromagnetic pilot valve 81 is provided in a pilot passage 82 connected to the main passage 71 and the spool 63a. Depending on whether or not the electromagnetic pilot valve 81 receives the pressure signal as the input, the electromagnetic pilot valve 81 opens or closes the pilot passage 82. More specifically, when the electromagnetic pilot valve 81 receives the pressure signal as the input, the electromagnetic pilot valve 81 closes the pilot passage 82. On the other hand, the electromagnetic pilot valve 81 ceases to receive the pressure signal as the input, the electromagnetic pilot valve 81 opens the pilot passage 82. In a state in which the pilot passage 82 is open, a pilot pressure against a force applied by the electromagnetic pilot mechanism 63d (namely, a pilot pressure pushing the spool 63a so that the spool 63a is moved toward the first position S1) is applied to the spool 63a.

In the transmission device 1F configured as described above, in a case where the controller 14 determines that the discharge condition is not met, the controller 14 outputs the pressure signal to the electromagnetic pilot valve 81. On the other hand, in a case where the controller 14 determines that the discharge condition is met, the controller 14 ceases to output the pressure signal to the electromagnetic pilot valve 81. Thus, the pilot pressure acts on the spool 63a via the electromagnetic pilot valve 81. A pressure source of the pilot pressure is the hydraulic pump 15. Therefore, a high pressure can be secured. Since the high pilot pressure acts on the spool 63a, the spool 63a remaining unmovable can be forcibly moved to the first position S1. In this way, the hydraulic oil discharged by the hydraulic pump 15 is guided to the speed reduction chamber 53 and the hydraulic oil is discharged from the speed increase chamber 54 to the tank 64. Soon, the transmission ratio set in the transmission 11 reaches the maximum speed reduction ratio. This makes it possible to prevent a situation in which the rotational speed of the generator 3 is excessively increased and the generator 3 is rotated at an undesired rotational speed.

The transmission device 1F according to Embodiment 7 can obtain advantages similar to those of the transmission device 1 according to Embodiment 1.

Other Embodiment

Although in the transmission devices 1 according to Embodiment 1 to Embodiment 7, the normally open electromagnetic valve is used as the discharge valve 65, a normally closed electromagnetic valve may be used as the discharge valve 65. Although the predetermined discharge condition used in the determination performed by the controller 14 is such that the detected rotational speed is higher than the allowable rotational speed, the predetermined discharge condition is not limited to this. For example, the predetermined discharge condition may be such that the transmission ratio (transmission gear ratio) set in the transmission 11 exceeds a predetermined upper limit transmission ratio, so long as the discharge condition indicates that the rotational speed of the output side is excessively increased. Alternatively, a sensor for detecting the position of the spool 63a may be provided, and the discharge condition may be such that the position of the spool 63a is not changed even though the controller 14 outputs the operation command (speed change signal) to the direction selector valve 63. Further, the discharge condition may be such that an angular acceleration rate of the transmission output shaft 26 may be equal to or higher than a predetermined angular acceleration rate. In this setting, the hydraulic oil can be discharged from the speed increase chamber 54 before the rotational speed of the transmission output shaft 26 reaches an upper limit value (e.g., allowable rotational speed) in a case where the transmission output shaft 26 is rapidly accelerated. This makes it possible to prevent a situation in which the rotational speed of the generator 3 is excessively increased and the generator 3 is rotated at an undesired rotational speed. Further, the discharge condition may include the rotational speed and the angular acceleration rate of the transmission output shaft 26. In a case where the rotational speed of the transmission output shaft 26 is equal to or higher than the allowable rotational speed and the angular acceleration rate of the transmission output shaft 26 is equal to or higher than the predetermined angular acceleration rate, the controller 14 may determine that the discharge condition is met.

Although in the transmission device 1D of Embodiment 5 and the transmission device 1E of Embodiment 6, the electromagnetic on-off valve 65D has an integrated configuration to have a function of the supply valve and the discharge valve, the supply valve and the discharge valve may be separately provided. Specifically, the supply valve may be provided in the supply bypass passage 75 and the discharge valve may be provided in the discharge bypass passage 76. Although in the transmission device 1E of Embodiment 6, the throttles 77, 78 are provided in the passages 73, 74, respectively, at locations where the passages 73, 74 are not branched, the throttles 77, 78 may be provided in branch portions of the passages 73, 74, respectively. In this configuration, the same advantages can be obtained.

Although in the transmission device 1F of Embodiment 7, the hydraulic pump 15 is used as the pressure source for the electromagnetic pilot valve 81, a pilot pump (not shown) may be used as the pressure source. When the electromagnetic pilot valve 81 receives the pressure signal as the input, the electromagnetic pilot valve 81 opens the pilot passage 82. Alternatively, when the electromagnetic pilot valve 81 receives the pressure signal as the input, the electromagnetic pilot valve 81 may close the pilot passage 82. Although the electromagnetic pilot valve 81 is used as the pressure application mechanism 80, a constituent other than the electromagnetic pilot valve 81 may be used as the pressure application mechanism 80. For example, a ball screw mechanism may be used as the pressure application mechanism 80. The ball screw mechanism is configured to actuate a ball screw by a motor. When the controller 14 outputs a pressure signal (current) to the motor and the motor receives it as an input, the motor is actuated to cause the ball screw to push the spool 63a toward the first position S1. This allows the spool 63a remaining unmovable to be forcibly moved to the first position S. As a result, the same advantages as those of the transmission device 1F of Embodiment 7 can be obtained.

The present invention is not limited to the above-described embodiments, and the configurations may be changed, added or deleted within the scope of the invention. The embodiments may be combined as desired. For example, a part of the constituents or a part of the methods of one of the embodiments may be applied to another embodiment. The transmission device described in the above-described embodiments may be used in power generation devices which are other than the power generation device for the aircraft or the like, automobiles or industrial machines, as well as the power generation device for the aircraft or the like.

Numerous improvements and alternative embodiment of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the scope of the invention.

REFERENCE SIGNS LIST 1, 1A, 1F transmission device
2 power generation system
3 generator
11 toroidal continuously variable transmission (toroidal CVT)
13 hydraulic actuation mechanism
14 controller
15 hydraulic pump
17 trunnion drive mechanism
18 hydraulic pressure supply device
19 rotational speed sensor
25 input disc
27 output disc
28 power roller
29 trunnion
51 piston
51a pressure receiving section
51b speed reduction pressure receiving surface
51c speed increase pressure receiving surface
52 cylinder
53 speed reduction chamber
54 speed increase chamber
55 compression coil spring
63 direction selector valve
63a spool
64 tank
65, 65A discharge valve
65D electromagnetic on-off valve
77 speed reduction chamber throttle
78 speed increase chamber throttle
80 pressure application mechanism

The invention claimed is:

1. A transmission device comprising:
an input disc and an output disc which are disposed to face each other;
a power roller which is tiltably disposed between the input disc and the output disc and transmits a rotational driving force of the input disc to the output disc in a transmission ratio corresponding to a tilt motion angle of the power roller;
a trunnion on which the power roller is rotatably supported, a position of the trunnion being changed to change the tilt motion angle of the power roller;
a trunnion drive mechanism which includes a speed reduction chamber and a speed increase chamber, changes the position of the trunnion to increase the transmission ratio in a case where the hydraulic oil is supplied to the speed reduction chamber and the hydraulic oil is discharged from the speed increase chamber, and changes the position of the trunnion to reduce the transmission ratio in a case where the hydraulic oil is supplied to the speed increase chamber and the hydraulic oil is discharged from the speed reduction chamber;
a hydraulic pump which discharges the hydraulic oil to be supplied to the trunnion drive mechanism;
a direction selector valve which selects a flow direction of the hydraulic oil discharged from the hydraulic pump to supply the hydraulic oil to one of the speed reduction chamber and the speed increase chamber and discharge the hydraulic oil from the other of the speed reduction chamber and the speed increase chamber;
a discharge valve which discharges the hydraulic oil from the speed increase chamber and is different from the direction selector valve; and
a controller which controls a movement of the discharge valve to discharge the hydraulic oil from the speed increase chamber in a case where a predetermined discharge condition is met.

2. The transmission device according to claim 1, wherein the discharge valve is configured to discharge the hydraulic oil from the speed increase chamber to the speed reduction chamber.

3. The transmission device according to claim 1, wherein the trunnion is movable in a speed reduction direction and a speed increase direction, wherein the trunnion drive mechanism is a hydraulic cylinder mechanism including a piston, a cylinder, and a biasing member,
wherein the cylinder includes the speed reduction chamber and the speed increase chamber,
wherein the piston is advanceable and retractable in the speed reduction direction and in the speed increase direction, and is configured to receive a hydraulic pressure from the speed reduction chamber in the speed reduction direction and receive the hydraulic pressure from the speed increase chamber in the speed increase direction, and
wherein the biasing member is configured to bias the piston in the speed reduction direction.

4. The transmission device according to claim 1, wherein the trunnion is movable in a speed reduction direction and a speed increase direction,
wherein the trunnion drive mechanism is a hydraulic cylinder mechanism including a piston and a cylinder,
wherein the cylinder includes the speed reduction chamber and the speed increase chamber,
wherein the piston is advanceable and retractable in the speed reduction direction and in the speed increase direction, and has a speed reduction chamber pressure receiving surface which receives a hydraulic pressure from the speed reduction chamber in the speed reduction direction and a speed increase chamber pressure receiving surface which receives the hydraulic pressure from the speed increase chamber in the speed increase direction, and
wherein the speed reduction chamber pressure receiving surface has a pressure receiving area larger than a pressure receiving area of the speed increase chamber pressure receiving surface.

5. The transmission device according to claim 1, comprising:
a supply valve which supplies the hydraulic oil discharged from the hydraulic pump to the speed reduction chamber,
wherein the controller causes the discharge valve to discharge the hydraulic oil from the speed increase chamber and causes the supply valve to supply the hydraulic oil to the speed reduction chamber.

6. The transmission device according to claim 5,
wherein the direction selector valve is connected to a tank from which the hydraulic oil is discharged,
wherein the discharge valve is connected to a location between the direction selector valve and the speed increase chamber and to a location between the direction selector valve and the tank,
wherein the supply valve is connected to a location between the direction selector valve and the speed reduction chamber and to a location between the direction selector valve and the hydraulic pump, and
wherein the controller is configured to control a movement of the discharge valve to discharge the hydraulic oil from the speed increase chamber to the tank and control a movement of the supply valve to supply the hydraulic oil from the hydraulic pump to the speed reduction chamber, in a case where the predetermined discharge condition is met.

7. The transmission device according to claim 6, further comprising:
a speed reduction chamber throttle provided between the direction selector valve and the speed reduction chamber; and
a speed increase chamber throttle provided between the direction selector valve and the speed increase chamber,
wherein the discharge valve is connected to the location between the direction selector valve and the speed increase chamber, the location being closer to the direction selector valve than the speed increase chamber throttle, and
wherein the supply valve is connected to the location between the direction selector valve and the speed reduction chamber, the location being closer to the speed reduction chamber than the speed reduction chamber throttle.

8. The transmission device according to claim 1, further comprising:
a rotational speed detector which outputs a signal corresponding to a rotational speed output from the output disc to detect the rotational speed,
wherein the predetermined discharge condition is such that the rotational speed is equal to or higher than a predetermined allowable rotational speed, and
wherein the controller is configured to detect the rotational signal based on the signal output from the rotational speed detector and determine whether or not the predetermined discharge condition is met based on the rotational speed which is detected.

9. A power generation system comprising:
a generator which generates electric power by a rotational driving force input to the generator;
the transmission device according to claim 1; and
a driving force transmission mechanism which transmits the rotational driving force of the output disc of the transmission device to the generator.

10. A transmission device comprising:
an input disc and an output disc which are disposed to face each other;
a power roller which is tiltably disposed between the input disc and the output disc and transmits a rotational driving force of the input disc to the output disc in a transmission ratio corresponding to a tilt motion angle of the power roller;
a trunnion on which the power roller is rotatably supported, a position of the trunnion being changed to change the tilt motion angle of the power roller;
a trunnion drive mechanism which includes a speed reduction chamber and a speed increase chamber, changes the position of the trunnion to increase the transmission ratio in a case where the hydraulic oil is supplied to the speed reduction chamber and the hydraulic oil is discharged from the speed increase chamber, and changes the position of the trunnion to reduce the transmission ratio in a case where the hydraulic oil is supplied to the speed increase chamber and the hydraulic oil is discharged from the speed reduction chamber;
a hydraulic pump which discharges the hydraulic oil to be supplied to the trunnion drive mechanism;
a direction selector valve which selects a flow direction of the hydraulic oil to be supplied to the trunnion drive mechanism according to a position of a spool to supply the hydraulic oil to one of the speed reduction chamber and the speed increase chamber and discharge the hydraulic oil from the other of the speed reduction chamber and the speed increase chamber;
a pressure application mechanism which applies a pressure to the spool to select the flow direction of the hydraulic oil to be supplied to the trunnion drive mechanism to cause the hydraulic oil to flow toward the speed reduction chamber; and
a controller which activates the pressure application mechanism to select the flow direction of the hydraulic oil in a case where a predetermined discharge condition is met.

11. The transmission device according to claim 10,
wherein the pressure application mechanism includes an electromagnetic pilot valve, and
wherein the electromagnetic pilot valve is configured to open a pilot passage in response to a pressure signal and apply pilot oil to the spool to push the spool by the pilot oil.

12. The transmission device according to claim 11,
wherein the pilot passage is connected to the hydraulic pump.

13. A power generation system comprising:
a generator which generates electric power by a rotational driving force input to the generator;
the transmission device according to claim 10; and
a driving force transmission mechanism which transmits the rotational driving force of the output disc of the transmission device to the generator.

* * * * *